United States Patent [19]

Guidez et al.

[11] 4,071,303

[45] Jan. 31, 1978

[54] ROTARY MACHINE HAVING A SUSPENDED SHAFT

[75] Inventors: Joël Guidez, Aix-en-Provence; Paul Lecouvreur, Fresnes; Jean Roumailhac, Versailles, all of France

[73] Assignee: Commissariat a l'Energie Atomique, Paris, France

[21] Appl. No.: 667,980

[22] Filed: Mar. 18, 1976

[30] Foreign Application Priority Data

Mar. 18, 1975 France ............................... 75 08543

[51] Int. Cl.² ............................................ F04D 29/04
[52] U.S. Cl. .................................. 415/112; 415/183; 417/424; 308/9; 308/107
[58] Field of Search ................ 415/112, 183; 417/407; 308/424, 9, 107, 122

[56] References Cited

U.S. PATENT DOCUMENTS

| 1,075,300 | 10/1913 | Moss | 415/184 |
| 1,949,474 | 3/1934 | Jacobsen | 415/183 |
| 3,871,789 | 3/1975 | Lameris | 415/112 |
| 3,898,793 | 8/1975 | Nakamura et al. | 415/112 |

FOREIGN PATENT DOCUMENTS

| 1,280,054 | 10/1968 | Germany | 415/183 |
| 319,020 | 2/1930 | United Kingdom | 415/183 |

Primary Examiner—C. J. Husar
Attorney, Agent, or Firm—McNenny, Pearne, Gordon, Gail, Dickinson & Schiller

[57] ABSTRACT

A rotary machine such as a pump has a vertical driveshaft suspended from the upper end and provided at the lower end with an impeller surrounded by a casing in which provision is made for a suction chamber fitted with stationary radial vanes integral with the casing. The driveshaft is rotatably mounted in a hydrostatic bearing placed beneath the impeller, a removable sleeve being mounted coaxially with the shaft between the suction chamber and the impeller.

5 Claims, 4 Drawing Figures

ROTARY MACHINE HAVING A SUSPENDED SHAFT

This invention relates to a rotary machine, especially of the type comprising a vertical shaft suspended from its upper end and is more particularly applicable to a high-power pump for the circulation of liquid metal coolant within a fast reactor vessel.

It is known that a pump of this type has a rotary shaft of substantial diameter and that provision is usually made for a hydrostatic bearing placed above the impeller-wheel of the pump. The bearing is supplied with sustentation fluid via a duct which is disposed axially within the shaft and draws the fluid directly from the discharge stream at the point of maximum pressure, any discharge or leakage from the bearing being returned at least partially into the suction zone. From the point of view of hydraulic operation, this arrangement has a disadvantage in that it gives rise to appreciable disturbances in the flow at the impeller inlet; these disturbances are caused by annular jets produced on the one hand by leakages from the bearing and on the other hand by entrainment of the fluid by the shaft itself. In fact the appreciable dimensions of the bearing and of that part of the shaft which is located in the suction zone of the impeller-wheel have the effect of giving a not-negligible tangential component to the indrawn fluid, thus substantially modifying the velocity profile at the impeller-wheel inlet. The combined effect of these two disturbances results in inferior operating characteristics and makes the pump more sensitive to cavitation phenomena.

In another order of ideas, an attempt has been made to improve the efficiency of the bearing. With this object in view, a number of different solutions have already been proposed and consist in increasing either its diameter, its length or both at the same time. In point of fact, the first solution is not readily applicable by reason of the proximity of the impeller-wheel whereas the second solution must necessarily take into account the differences in positioning of the shaft with respect to the stationary portions of the bearing, these differences being more marked as the shaft is of greater length.

The aim of the present invention is to overcome these two types of disadvantage by placing the rotary shaft opposite to the suction zone, the result thereby achieved being to improve the dynamic arrangement of the flow of indrawn fluid, to increase the radial lift of the bearing and finally to permit easier assembly of the different pump components.

To this end, the invention is concerned with a rotary machine having a vertical driveshaft suspended from the upper end thereof and provided at the lower end thereof with an impeller-wheel surrounded by a casing in which is incorporated a suction chamber fitted with stationary radial vanes integral with the casing. As an essential feature of the invention, said driveshaft is rotatably mounted in a hydrostatic bearing placed beneath said impeller-wheel, a removable sleeve being mounted coaxially with said shaft between said suction chamber and said impeller-wheel.

As an advantageous feature, said sleeve comprises a cylindrical shell extended by a member of revolution having a conical or concave and generally cylindrical profile, said shell being housed within a recess of said shaft which has the same profile and adapted to correspond in shape to the fluid stream which is drawn by the pump impeller through the stationary vanes of the suction chamber.

In a preferred embodiment of the invention, the member of revolution of said sleeve is provided with radial ribs disposed in the line of extension of the vanes of the suction chamber.

In another alternative embodiment, the radial ribs are integral with the suction chamber.

The practical arrangements defined in the foregoing permit of considerable improvement in the hydraulic characteristics of the machine. In fact, by mounting the hydrostatic bearing beneath the pump impeller, the end of the shaft is no longer in an overhung position whilst its diameter is no longer limited by the presence of the suction chamber of the pump. The lift of the bearing can consequently be increased to an appreciable extent without increasing its length; this increase in lift makes it possible to eliminate shaft oscillations which may arise from any possible misalignments with the bearing axis.

It is also possible by means of this assembly to prevent leakages into the fluid stream on the suction side of the pump, thus eliminating disturbances in this zone. At the same time, the tangential component produced by entrainment of fine jets of liquid by the shaft itself is practically concelled by means of the sleeve which surrounds the shaft. The shape of said sleeve at the level of the fluid stream as well as the ribs which may be present as extensions of the suction chamber vanes ensure uniform and progressive enclosure of the flow of liquid without any attendant danger of local disturbances.

Further properties of a rotary machine in accordance with the invention will become apparent from the following description of one exemplified embodiment which is given by way of indication without any limitation being implied, reference being made to the accompanying drawings, wherein.

Figure 1:
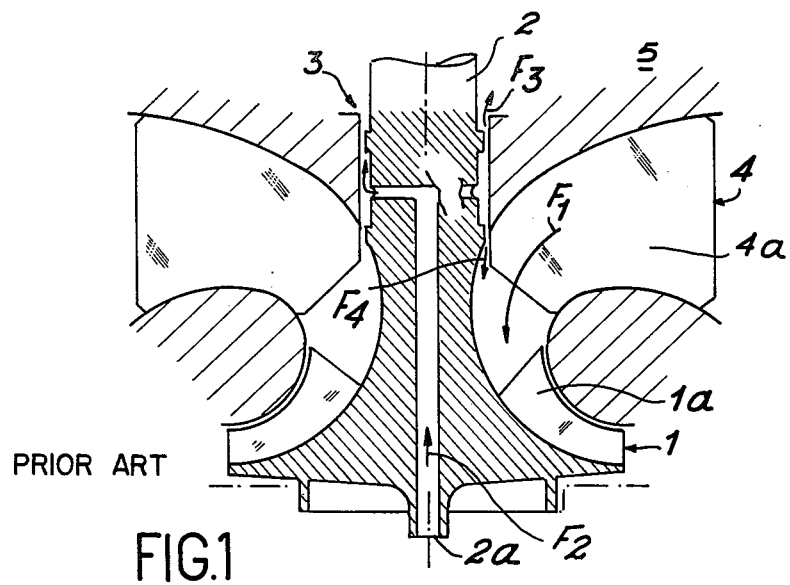
FIG. 1 is a diagrammatic illustration of a known form of construction of a pump comprising a suspended shaft.

In FIG. 1, the reference 1 designates the impeller-wheel of a pump of known type which is mounted at the end of a vertical driveshaft 2, said driveshaft being rotatably mounted between two bearings. One bearing constitutes a top thrust-bearing which is not illustrated and the other bearing constitutes the hydrostatic bearing designated by the reference 3 and provided at the lower end of the shaft above the impeller-wheel 1 in order to ensure centering of this latter.

The lifting fluid or so-called sustentation fluid of the bearing 3 is of the same type as the fluid which is aspirated by the pump, this latter being primarily designed for the circulation of a liquid metal, especially sodium, within a fast reactor vessel. Said fluid is entrained by the motion of the vanes 1a of the impeller-wheel 1 through a suction chamber 4 formed in a stationary casing 5 which surrounds the impeller-wheel. Said suction chamber is provided in the usual manner with a series of suitably shaped vanes 4a which are disposed in the radial direction towards the rotary shaft 2. The direction of flow of the fluid within the suction chamber 4, then within the impeller-wheel 1 of the pump is represented diagrammatically in the drawing by the arrow $F_1$.

The bearing 3 is supplied with sustentation fluid by means of a suitable withdrawal from the discharge circuit of the pump impeller 1 via a duct 2a located along the axis of the shaft 2, the flow of fluid being represented diagrammatically by the arrow $F_2$. Under these conditions, leakages from the bearing 3 take place in the form of annular jets in the direction of the arrows $F_3$ and $F_4$. It is thus apparent that the leakage at the lower end of the bearing as represented by the arrow $F_4$ produces as it flows back to the fluid stream a turbulence which is greater in magnitude as the dimensions of the shaft and of the bearing are larger. Moreover, the arrangement provided for the bearing 3 above the impeller-wheel necessarily limits the diametral dimensions of said bearing by reason of the presence of the suction chamber at the same level.

Figure 2:
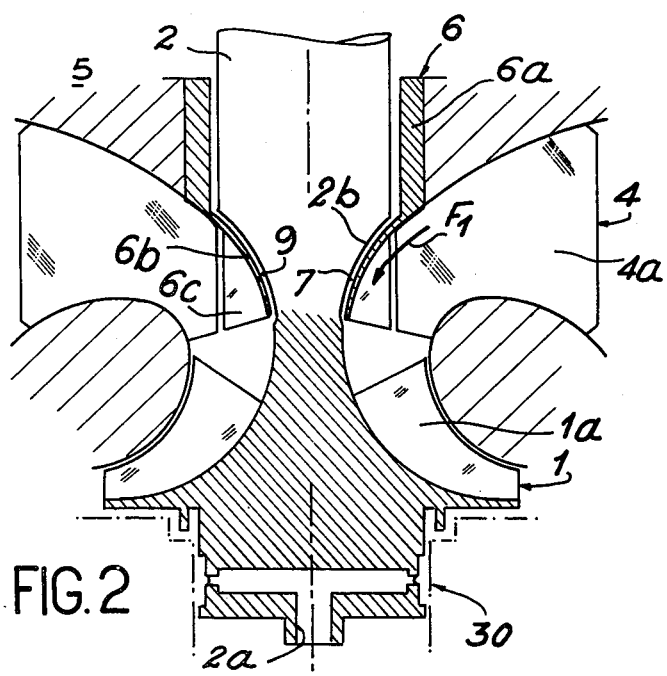
FIG. 2 is a diagrammatic illustration of a pump assembly comprising a suspended shaft in accordance with the invention.

The mounting of the bearing beneath the impeller-wheel and the arrangement of the rotary shaft in accordance with the invention make it possible to overcome the disadvantages of the technique adopted in the prior art. In fact, as is apparent from FIG. 2, the shaft 2 is mounted in such a manner as to ensure that the bearing 30 in which the lower end of the shaft is rotatably mounted is placed beneath the impeller-wheel 1. Moreover, said shaft 2 is surrounded by a removable sleeve 6 which may be constructed in two parts in order to facilitate the assembly of this letter. The upper portion 6a of the sleeve is constituted by a cylindrical shell surrounding the shaft whilst the lower portion 6b of said sleeve which extends the shell in the downward direction is formed by a member or surface of revolution having its axis coincident with the axis of rotation of said shaft, the surface having a conical or preferably concave arcuate profile so as to correspond externally to the shape of the fluid stream as this latter is discharged from the vanes 4a of the suction chamber 4. To this end, the shaft 2 is in turn provided opposite to the portion 6b with a suitably adapted incurved profile 2b so as to form a limited clearance space 7 with the sleeve 6. The surface of revolution has a diameter which varies in direct constant relation to the diameter of the shaft. Preferably and in accordance with a particular feature of the invention, a series of ribs 6c are formed in that external surface of the portion 6b of the sleeve 6 which is in contact with the fluid stream as this latter is drawn into the pump. Said ribs are disposed radially with respect to the shaft and located in the line of extension of the vanes 4a of the suction chamber in order to ensure suitable continuity of these latter at the inlet of the pump impeller. The shaft 2 thus has a varying diameter in the form of a waisted or "hour-glass" shape surrounded by the portion 6b, the ribs 6c of which serve to reduce the overhang of the suction chamber vanes 4a since these latter cannot be provided with any bearing point along the shaft. The result thereby achieved is to increase the resistance of these components to vibrations. It should finally be noted that the ribs 6c of the portion 6b are greater in length than in width and can readily be formed.

By virtue of the arrangement of the hydrostatic bearing 30 beneath the pump impeller 1 in accordance with the invention, it is clearly no longer necessary to limit the transverse dimension of said bearing by reason of the presence of the suction chamber as in designs of the prior art. Under these conditions, the pressure available for ensuring radial lift of the bearing 30 can be obtained from the pressure at the outlet of the pump diffuser to which is added an additional pressure resulting from a centrifugation effect produced by the bearing itself and this latter accordingly behaves as a centrifugal pump. This centrifugation effect has a beneficial influence on the operation and, all other things being equal, increases rapidly with the diameter of the bearing.

It will in fact be recalled that the lift of a hydrostatic bearing is given by the relation:

$$F = KPLDe,$$

wherein:
 P is the available supply pressure at the level of said bearing,
 L is the height of the bearing,
 D is the diameter of the bearing,
 e is the permissible eccentricity in said bearing,
 K is a lift coefficient determined as a function of the geometry of the bearing.

This formula clearly shows that the arrangements according to the invention make it possible to increase the lift by increasing in particular the diameter and the pressure.

Figure 3:
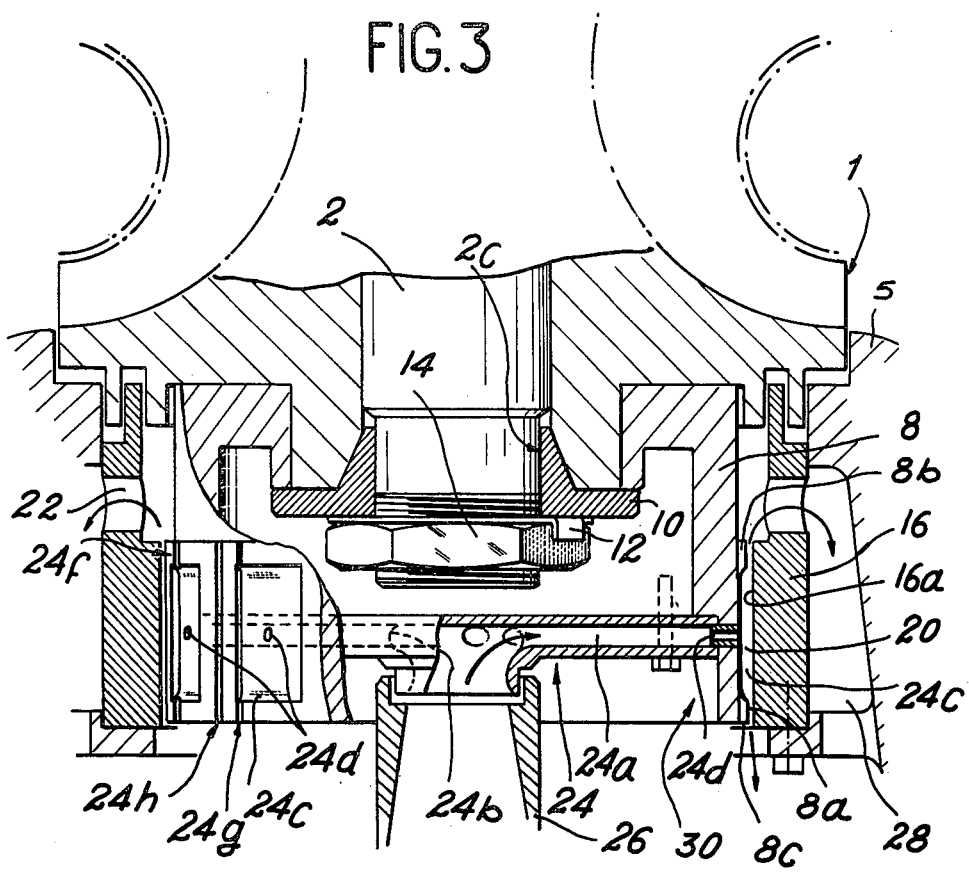
FIG. 3 is a sectional view in elevation showing the hydrostatic bearing provided at the lower end of the shaft beneath the impeller-wheel of the machine.

The embodiment which is illustrated in FIG. 3 is primarily intended to satisfy the criteria which have just been mentioned. The bearing 30 has a cylindrical rotor 8 which is centered within the casing 5 by means of an endpiece 2c fitted at the extremity of the shaft 2. The assembly is held in position by conventional means such as a shouldered flange component 10, a locking washer 12 and a nut 14. The rotor 8 has a lateral surface 8a and radial faces 8b, 8c. A stator 16 which is rigidly fixed to the casing 5 has a smooth bore 16a which is concentric with the lateral surface 8a but makes provision for a radial clearance space 20. Exhaust ports 22 formed in the wall of the stator 16 serve to discharge the upwardly directed leakage from the bearing via a duct 28 which returns said leakage into the low-pressure fluid circuit (not shown) of the pump. The downward leakage passes directly into said fluid circuit.

Figure 4:
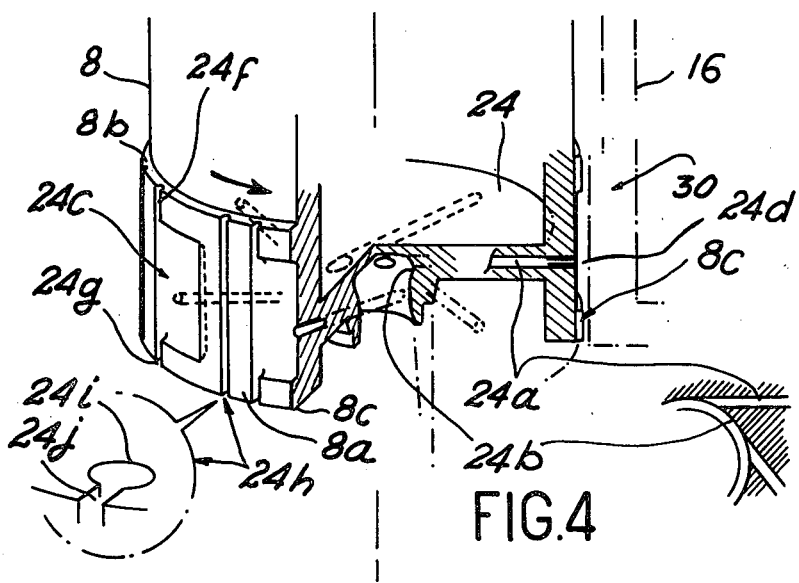
FIG. 4 is a view in perspective showing a detail of FIG. 3.

The rotor 8 (as shown in FIGS. 3 and 4) comprises a removable centrifugal impeller-wheel 24. This latter has ducts 24a which communicate on the one hand with an open axial chamber 24b and on the other hand with recesses 24c formed at equal distances in the lateral surface 8a of the bearing. An axial duct 26 centered with respect to the opening of the chamber 24b is supplied with the fluid withdrawn from the high-pressure circuit of the pump. Said ducts 24a open into the corresponding recesses 24c via individual nozzles 24d which serve to adjust the optimum value of the fluid pressure within the clearance space 20 provided between the rotor 8 and the stator 16. The internal ducts 24a are connected tangentially to the chamber 24b.

The adaptation of the nozzles 24d thus partly governs the lift coefficient K of the bearing. The recesses 24c have an open quadrangular section and a small depth; this geometry and especially the dimension of the longitudinal edge of each recess plays a further part in governing the same lift coefficient K and the minimum flow rate of fluid within the bearing.

Each recess 24c communicates with the radial faces 8b and 8c of the rotor 8 by means of two cleaning ducts 24f, 24g which are placed in line along a generator of the lateral surface 8a and on each side of a longitudinal edge of the open section of the corresponding recess. Said ducts 24f, 24g are integral with the rotor 8, open into the radial faces 8b, 8c and are intended to facilitate the removal of any solid substances which may possibly penetrate into the recesses 24c.

Finally, discharge grooves 24h which are intended to ensure part of the leakage from the bearing 30 are formed in the lateral surface 8a and located at equal distances between the recesses 24c. In the example under consideration, said grooves are formed in a duct 24i having an almost closed circular cross-section and opening onto the lateral surface 8a via a longitudinal slot 24j. The fluid which is discharged under pressure through the nozzles 24d is thus distributed within the clearance space 20 by the open section of the recesses 24c and produces the desired radial lift effect between the rotor 8 and the stator 16. Discharge of the fluid towards the top of the bearing 30 takes place by means of exhaust ports 22 and by means of the duct 28, and in the downward direction into the low-pressure circuit of the pump. Distribution of the fluid under pressure within the clearance space 20 has the effect of centering the free end of the shaft 2 and of damping the movements of this latter which are caused especially by variations in operating speed of the pump while preventing any contact between the rotor and the stator.

What we claim is:

1. A rotary machine having a vertical drive shaft of varying diameter suspended from the upper end thereof and provided at the lower end thereof with an impeller-wheel surrounded by a casing in which is incorporated a suction chamber fitted with stationary radial vanes integral with the casing, wherein said shaft is rotatably mounted in a hydrostatic bearing placed beneath said impeller-wheel, a removable stationary sleeve being mounted coaxially with said shaft between said suction chamber and said impeller-wheel, said sleeve including a surface of revolution having its axis coincident with the axis of rotation of said shaft, said surface of revolution having a diameter varying in direct constant relation to the diameter of said shaft.

2. A rotary machine according to claim 1, wherein said surface of revolution has an arcuate profile, said surface being concentric to a portion of said shaft having the same profile as said surface of revolution.

3. A rotary machine according to claim 2, wherein said surface of revolution of said sleeve is provided with radial ribs disposed in the line of extension of said vanes of said suction chamber.

4. A rotary machine according to claim 1, wherein the diameter of said bearing which is mounted beneath said impeller-wheel has a value which is greater than that of said shaft at the level of said sleeve.

5. A rotary machine according to claim 1, wherein said bearing comprises a rotor having a centrifugation wheel provided with internal ducts which establish individual fluid connections with an axial admission duct and with recesses formed in the lateral surface of said rotor.

* * * * *